United States Patent
Dupoiron et al.

(10) Patent No.: US 10,341,587 B2
(45) Date of Patent: Jul. 2, 2019

(54) MATRIX-ARRAY SENSOR WITH TEMPORAL CODING WITHOUT ARBITRATION

(71) Applicant: COMMISSARIAT A L'ENERGIE ATOMIQUE ET AUX ENERGIES ALTERNATIVES, Paris (FR)

(72) Inventors: Camille Dupoiron, Grenoble (FR); Gilles Sicard, Crolles (FR); Arnaud Verdant, Saint-Nazaire les Eymes (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/946,653

(22) Filed: Apr. 5, 2018

(65) Prior Publication Data
US 2018/0295308 A1    Oct. 11, 2018

(30) Foreign Application Priority Data

Apr. 7, 2017   (FR) ...................... 17 53032

(51) Int. Cl.
*H04N 5/335* (2011.01)
*H04N 5/374* (2011.01)
(Continued)

(52) U.S. Cl.
CPC ............. *H04N 5/3355* (2013.01); *H04L 1/12* (2013.01); *H04N 5/378* (2013.01); *H04N 5/3745* (2013.01); *H04N 5/3741* (2013.01)

(58) Field of Classification Search
CPC ............... H04N 5/3355; H04N 5/3745; H04N 5/37455; H04N 5/335–5/379; H01L 1/12; H01L 27/146–27/14698
See application file for complete search history.

(56) References Cited

U.S. PATENT DOCUMENTS

| 6,253,161 B1 | 6/2001 | Arias-Estrada |
| 2005/0273661 A1 | 12/2005 | Brajovic |

(Continued)

FOREIGN PATENT DOCUMENTS

| FR | 3 035 759 A1 | 11/2016 |
| WO | 2014/174498 A1 | 10/2014 |

OTHER PUBLICATIONS

N. Massari et al., "A collision-free time-to-first spike camera architecture based on a winner-take-all network," 18th European Conference on Circuit Theory and Design, Aug. 27, 2007, pp. 950-953, XP031257906.

(Continued)

*Primary Examiner* — Paul M Berardesca
(74) *Attorney, Agent, or Firm* — Baker & Hostetler LLP

(57) ABSTRACT

A matrix-array sensor comprises a matrix of detection elements arranged in rows and columns and a readout circuit for each column, the elements of one and the same column linked to the corresponding readout circuit via a bus, each element comprising a sensor, a charge integrator configured to accumulate charge generated by the sensor, a comparator configured to generate a trigger signal when a voltage level across the terminals of this comparator reaches a threshold level, and a bus access logic circuit which is configured to receive, as input, the trigger signal and to attempt to transmit, over the bus, an address of the element in the column, wherein the elements of one and the same column have predetermined bus access priority levels, and wherein the bus access logic circuit of each element is configured: to abandon transmission of the address and reset the charge integrator of the detection element if the bus is pre-empted by an element having a higher priority level; to count the number of attempts made before being able to transmit the (Continued)

address; and to communicate the number to the readout circuit along with the address of the element.

12 Claims, 5 Drawing Sheets

(51) Int. Cl.
*H04N 5/378* (2011.01)
*H04L 1/12* (2006.01)
*H04N 5/3745* (2011.01)

(56) References Cited

U.S. PATENT DOCUMENTS

| | | |
|---|---|---|
| 2010/0182468 A1 | 7/2010 | Posch et al. |
| 2014/0313387 A1* | 10/2014 | Vogelsang ........... H04N 5/3696 348/308 |
| 2017/0041571 A1* | 2/2017 | Tyrrell .................. H04N 5/335 |

OTHER PUBLICATIONS

J Lenero-Bardallo et al.,"A high dynamic range image sensor with linear response based on asynchronous event detection," 2015 European Conference on Circuit Theory and Design.

Z. Kalayjian et al., "Asynchronous Communication of 2D Motion Information Using Winner-Takes-All Arbitration," Analog Integrated Circuits and Signal Processing, vol. 13, 1997, pp. 103-109.

* cited by examiner

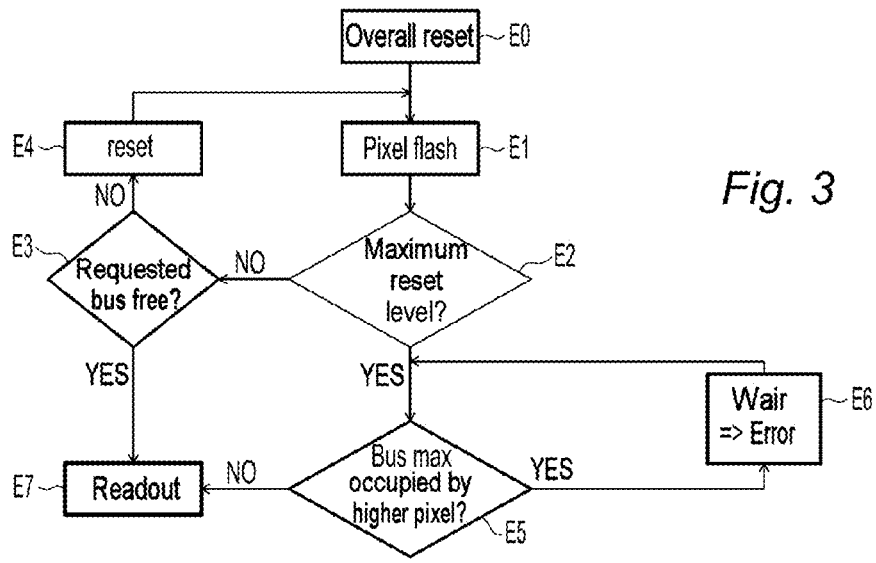
Fig. 3
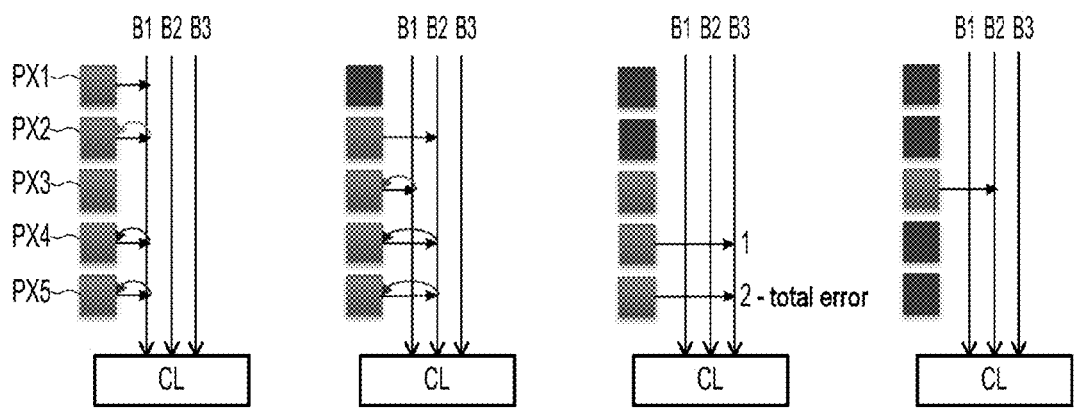
Fig. 4a  Fig. 4b  Fig. 4c  Fig. 4d
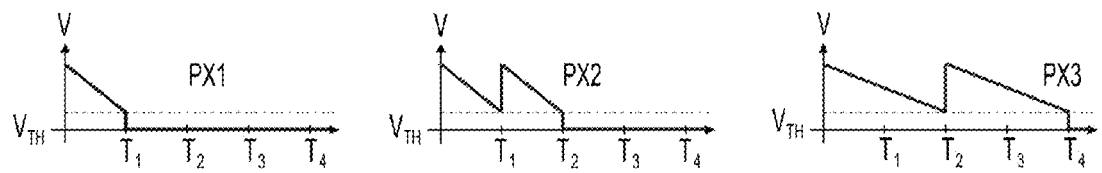
Fig. 5a  Fig. 5b  Fig. 5c
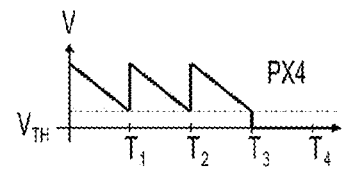 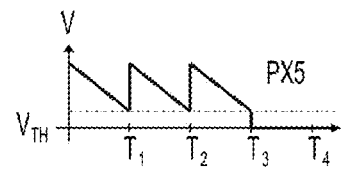
Fig. 5d  Fig. 5e

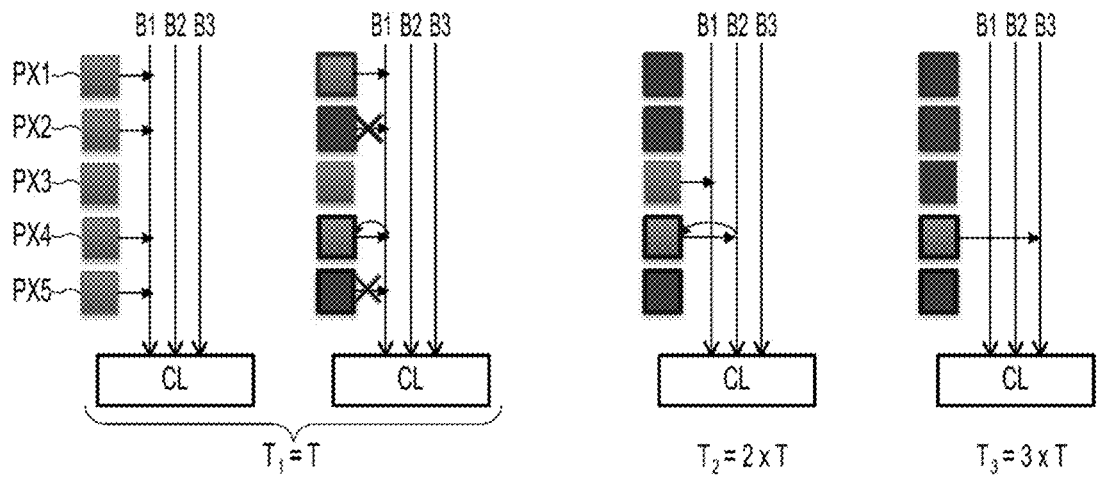
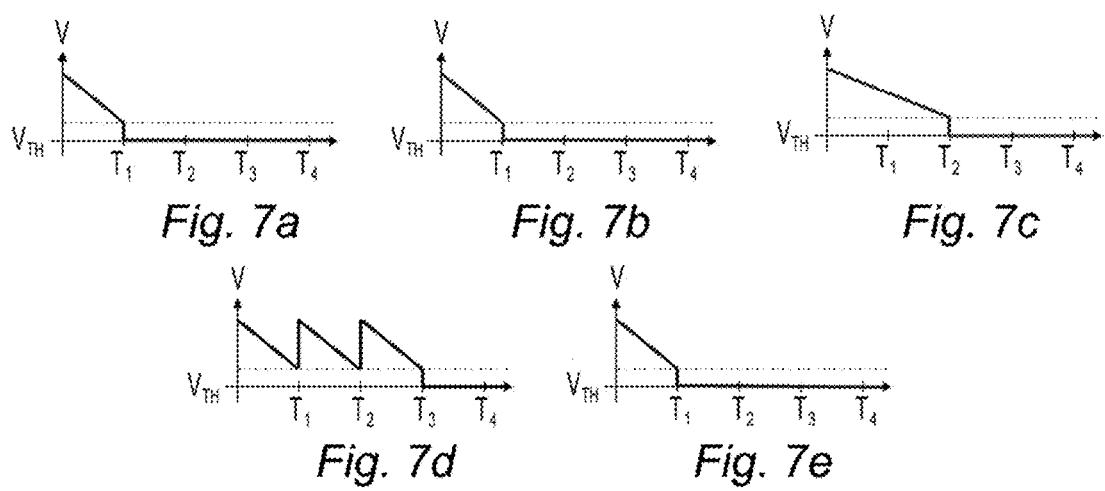
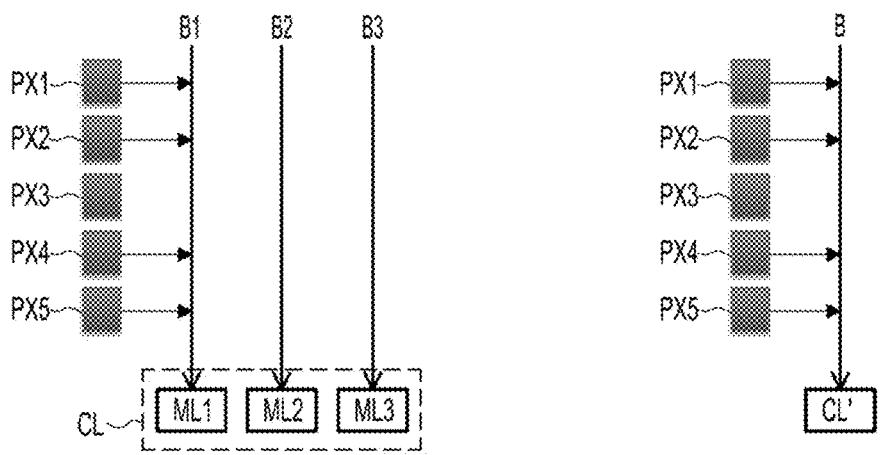

Original

2 Buses : PSNR= 18.4943dB

3 Buses : PSNR= 29.9434dB

4 Buses : PSNR= 36.5402dB

MATRIX-ARRAY SENSOR WITH TEMPORAL CODING WITHOUT ARBITRATION

CROSS-REFERENCE TO RELATED APPLICATIONS

This application claims priority to foreign French patent application No. FR 1753032, filed on Apr. 7, 2017, the disclosure of which is incorporated by reference in its entirety.

FIELD OF THE INVENTION

The invention pertains to a matrix-array sensor, such as an image sensor, with temporal coding. More particularly, the invention pertains to a sensor with temporal coding exhibiting low energy consumption and, preferably, low hardware complexity. The invention lends itself particularly well to production using CMOS technology, in particular highly miniaturized CMOS technology (having critical dimensions smaller than 50 nm, for example of the order of 28 nm; this is referred to as an "advanced technology"). The invention is mainly intended for "machine vision" applications.

BACKGROUND

Conventional CMOS image sensors are generally of the type referred to as "active pixel" sensors (APS), wherein each pixel comprises a photodetector, an integration capacitor and a readout circuit. The integration capacitor is charged to an initialization voltage value, then discharged through the photodetector at a speed that is dependent on the light intensity incident on this photodetector (equivalently, it may be considered that the capacitor integrates the photogenerated charge). The voltage across the terminals of the integration capacitor is read out after a determined time, allowing said light intensity to be determined, then the pixel is reset. In "digital pixel" architectures, each pixel further comprises an analog-to-digital converter and a memory, and therefore delivers, as output, a digital signal representative of the light intensity to which it has been exposed. In these architectures, all of the pixels are read out at a predefined image acquisition rate. This results in high energy consumption which is undesirable for certain applications, for example in the case of energy-autonomous sensors.

A different approach is that of sensors with temporal coding (the term "event-based" sensor is also used). In this type of imager, each pixel integrates the charge generated by its photodetector until its voltage reaches a threshold; once this condition has been met, it sends a signal allowing it to be identified (its address); it is generally said to "raise a flag". The light intensity incident on the pixel is determined by measuring the time that has elapsed between the initialization of the integration capacitor and the time at which the flag was raised. In other types of sensors with temporal coding, the condition determining whether the flag is raised may be an event other than the crossing of a threshold, for example a difference with respect to the voltage value of another pixel, to a previously measured voltage value, etc. In all cases, the pixels are read out asynchronously. By way of example, document US 2005/273661 discloses a matrix-array sensor with temporal coding.

In sensors with temporal coding, the asynchronous readout of pixels entails a risk of conflict, since several pixels may attempt to transmit their address at the same time over one and the same communication bus. Typically, this problem is solved by means of an arbitration mechanism, for example implemented by the AER (address event representation) protocol, meaning that events are represented by their address and the time at which the address was transmitted, which requires handshaking. The use of an arbiter makes the structure of the sensor more complex, which has a cost in terms of area of silicon occupied, and substantially increases its energy consumption.

Document FR 3 035 759 describes an image sensor with temporal coding in which redundancy is avoided by virtue of a mechanism for inhibiting the pixels close to a pixel that has raised its flag, and conflicts between the remaining events are prevented by means of the AER protocol.

The article by J. A. Leñero-Bardallo, R. Carmona-Galán and Á. Rodriguez-Vázquez "A high dynamic range image sensor with linear response based on asynchronous event detection", 2015 European Conference on Circuit Theory and Design, describes an image sensor combining event-based, asynchronous readout and conventional analog readout. The light intensity associated with a pixel is determined from the number of events generated within a predetermined acquisition time and from the "residual" representing the voltage across the terminals of the integrator at the end of this acquisition time. This allows the light intensity dynamic range of the sensor to be increased, but an arbiter remains necessary.

The article by Z. Kalayjian and A. G. Andreou "Asynchronous Communication of 2D Motion Information Using Winner-Takes-All Arbitration", Analog Integrated Circuits and Signal Processing, 13, 103-109 (1997) describes an image sensor with temporal coding using WTA (winner-takes-all) arbitration instead of an AER protocol. See also the article by N. Massari, S. Arsalan Jawed and M. Gottardi "A Collision-Free Time-to-First Spike Camera Architecture Based on a Winner-Take-All Network", 18th European Conference on Circuit Theory and Design, 2007 (ECCTD 2007).

In all cases, arbitration is required, as otherwise the quality of the acquired images risks being severely degraded due to conflicts between pixels attempting to transmit their addresses at the same time.

SUMMARY OF THE INVENTION

The invention aims to overcome the aforementioned drawbacks of the prior art. More particularly, the invention aims to decrease the energy consumption and/or the hardware complexity of image sensors with temporal coding, without however sacrificing the quality of the acquired images to too great an extent. According to the invention, this aim is achieved by replacing arbitration with a system of fixed priorities, in association with a reset-counting mechanism which prevents the loss of information in the event of a conflict between pixels.

One subject of the invention, allowing this aim to be achieved, is a matrix-array sensor comprising a matrix of detection elements that are arranged in rows and in columns and a readout circuit for each column, the detection elements of one and the same column being linked to the corresponding readout circuit via a bus, each detection element comprising a sensor for generating an electric current having an intensity that is representative of a physical quantity to be detected, a charge integrator configured to accumulate charge generated by said sensor, a comparator configured to generate a trigger signal when a voltage level across the terminals of this comparator reaches a threshold level, and a bus access logic circuit configured to receive, as input, said trigger signal and, following reception of said signal, to attempt to transmit, over said bus, an address of said detection element in the column, wherein the detection elements of one and the same column have different bus access priority levels, and wherein said bus access logic circuit of each detection element is configured: to abandon transmission of said address and reset the charge integrator of the detection element if the bus is pre-empted by a detection element having a higher priority level; to count the number of attempts made before being able to transmit said address; and to communicate said number to said readout circuit along with said address of the detection element.

According to particular embodiments of such a matrix-array sensor:

Said bus may comprise a plurality of elementary buses, the bus access logic circuit of each detection element being configured to transmit said address over an elementary bus chosen according to the number of attempts it has made before being able to transmit the address of the detection element.

Each bus access logic circuit may be configured to abandon transmission of the address of the detection element the moment an elementary bus of said bus is pre-empted by a detection element having a higher priority level.

Each said readout circuit may comprise a plurality of readout modules that are associated with respective elementary buses and each bus access logic circuit may be configured to abandon transmission of the address of the detection element when the elementary bus over which it is attempting to carry out the transmission is pre-empted by a detection element having a higher priority level, and to carry out the transmission otherwise.

Each bus access logic circuit may be configured to wait for the bus to be available after having made a predetermined maximum number of transmission attempts.

Said readout circuit may be configured to determine a light intensity level received by a detection element having transmitted its address from the instant in time at which said address was transmitted and the number of transmission attempts made.

Each bus access logic circuit may be configured to order the sensor and the comparator of the detection element to turn off after having transmitted its address, and to order them to turn back on again after a frame period.

Each bus access logic circuit may be configured to order the sensor and the comparator of the detection element to turn off after having made an attempt to transmit the address of said detection element at the same time, and after one and the same number of attempts, as the detection element having the priority level immediately above it.

The priority levels of the detection elements of a column may be predetermined. More particularly, the priority levels of the detection elements of a column may correspond to their rank in said column.

As a variant, the priority levels of the detection elements of a column may depend both on their rank in said column and on the number of bus access attempts already made.

Another subject of the invention is an image sensor formed by such a matrix-array sensor, wherein said detection elements are pixels comprising, as a sensor, a photodetector.

BRIEF DESCRIPTION OF THE DRAWINGS

Other features, details and advantages of the invention will become apparent upon reading the description provided with reference to the appended drawings, which are given by way of example and in which:

FIGS. 2b, 2c and 2d are logic diagrams illustrating possible embodiments of certain blocks of the diagram of FIG. 2a;

FIG. 3 is a flowchart illustrating the operation of the pixel of FIG. 2a;

FIGS. 4a-4d and 5a-5e illustrate the management of bus access conflicts according to one embodiment of the invention;

FIGS. 6a-6d and 7a-7e illustrate a mechanism for pooling spatial information according to one embodiment of the invention;

FIGS. 8a and 8b schematically illustrate two alternative embodiments of the image sensor of the invention.

DETAILED DESCRIPTION

Figure 1:
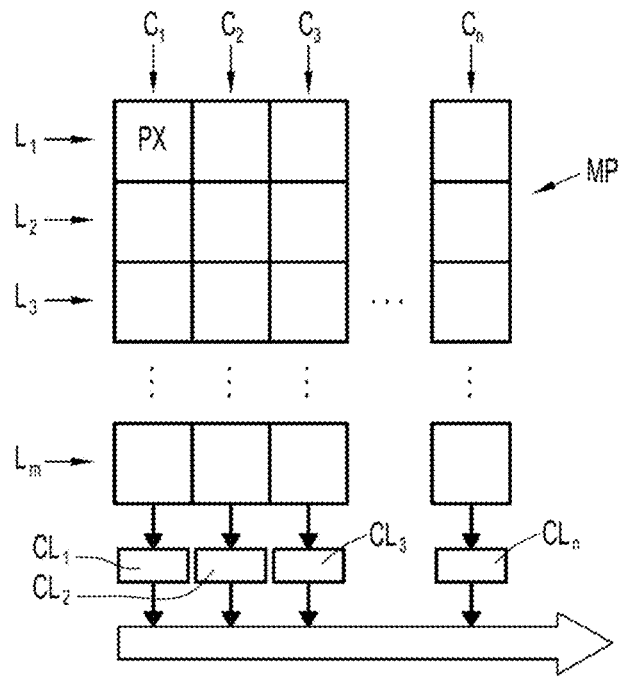
FIG. 1 is an overall view of an image sensor according to one embodiment of the invention.

FIG. 1 schematically shows an image sensor according to one embodiment of the invention. This sensor comprises a matrix MP of pixels PX arranged in rows—$L_1$, $L_2$, $L_3$ ... $L_m$—and in columns $C_1$, $C_2$, $C_3$ ... $C_m$. The pixels of each column are linked to one and the same readout circuit $CL_1$, $CL_2$, $CL_3$ ... $CL_n$ via a respective bus (not shown). According to the principle of imaging by temporal coding, each pixel sends a trigger signal over the bus of its column the moment its photogenerated charge has reached a threshold. The trigger signal allows the pixel to be identified; stated otherwise it represents its "address" in the column. The time at which a trigger signal is received by a readout circuit indicates the intensity of illumination of the corresponding pixel. The information collected by the various readout circuits is collected to allow an image to be reconstructed.

The invention differs from the prior art mainly in the technique it employs to solve bus access conflicts.

According to one particular embodiment of the invention, all of the pixels are reset at the same time, at regular intervals corresponding to a predefined "frame period". As a variant, the reset time may vary depending on the column.

Although generally the case, it is not essential for the pixels PX of the matrix MP actually to be arranged in a rectangular pattern. What is necessary is for it to be possible to identify "columns", i.e. ordered series of pixels linked to one and the same readout circuit via a bus.

Figure 2A:
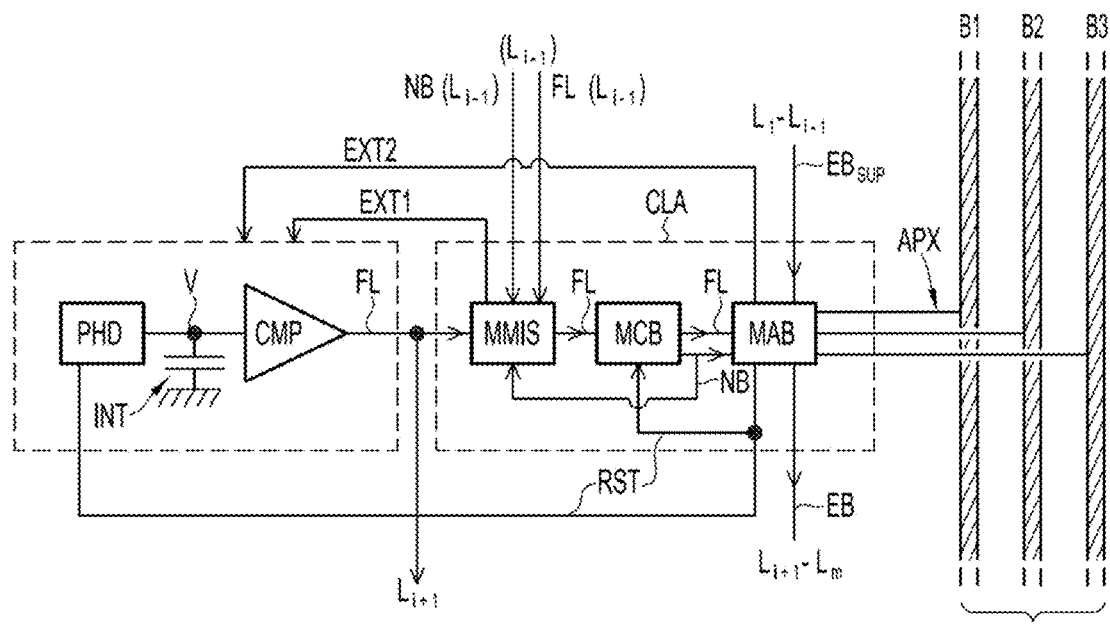
FIG. 2a is a functional diagram of a pixel of the sensor of FIG. 1.

FIG. 2a is a functional diagram of a pixel PX of the matrix MP of FIG. 1. More particularly, a pixel belonging to the $i^{th}$ row is considered, where "i" is comprised between 2 and m−1 (stated otherwise, it is neither the first nor the last column).

Conventionally, the pixel comprises a photodetector PHD (typically a photodiode, for example a pinned photodiode), a charge integration capacitor INT, a comparator CMP and a bus access logic circuit CLA, connected to a bus B. In the embodiment of FIG. 2a, the bus B consists of a plurality of (for example 3) elementary buses B1, B2, B3, each comprising a plurality of conductive lines.

The photodetector—integration capacitor—comparator assembly is completely conventional. The photodetector PHD, when it is illuminated, generates charge which is integrated by the capacitor INT, causing the voltage V across its terminals to vary. Generally, the photodetector PHD generates a current I which discharges the capacitor INT, the value of the initialization voltage of which is $V_{RST}$. At a time t after initialization, the value of the voltage V is therefore:

$$V(t) = V_{RST} - \frac{1}{C}t \quad (1)$$

C being the capacitance value of the capacitor INT.

The voltage V is applied to one input of a comparator CMP, and a threshold voltage $V_{TH}$ is applied to another input (not shown). When V reaches the threshold $V_{TH}$, the comparator generates a (binary) trigger signal FL, which is delivered as input to the bus access logic circuit CLA. This circuit has four main functions:

Transmitting, over the bus B, a signal APX, consisting of multiple bits, representing the address of the pixel within the column (stated otherwise, its rank "i"), to inform the readout circuit of the column that a trigger has occurred;

Managing bus access conflicts between pixels of the column; to do this, it receives a binary signal from the block of pixels of the column belonging to rows of lower rank ("preceding pixels"), $L_1$–$L_{i-1}$, and sends a binary signal to the block of pixels of the column belonging to rows of higher rank ("following pixels"), $L_{i+1}$–$L_m$.

Turning off (binary signals EXT1, EXT2) the photodetector and the comparator of the pixel once the signal APX has been transmitted correctly or, as will be explained below, when there is no need to transmit the information (these elements are then turned back on at the start of the next frame period);

Resetting (binary signal RST) the photodetector and the charge integrator in the event of a bus access conflict preventing the transmission of the signal APX.

Optionally, the bus access logic circuit CLA may also switch off the photodetector and the comparator of the pixel in order to pool the spatial information of the image; to do this, it exchanges signals with its nearest neighbors: it receives a signal from the pixel of the column belonging to row $L_{i-1}$ of immediately lower rank and it transmits a signal to the pixel of the column belonging to row $L_{i+1}$ of immediately higher rank. This mechanism will be described below.

When it receives a trigger signal, after a time T from reset, the bus access logic circuit CLA seeks to transmit the signal APX over the first elementary bus B1. If the elementary bus B1, or any other elementary bus of the bus B, is already occupied by a pixel of lower rank, the circuit CLA abandons transmission and sends a reset signal RST to the photodetector PHD and to the integrator INT. Stated otherwise, the lower the rank of the pixel, the higher its priority level (the inverse is also possible). After a time T, the comparator generates the trigger signal anew, and the circuit CLA once again attempts to access the bus. This time, however, access is attempted over the elementary bus B2. In the event of another failure, a third and last access is attempted, after reset, over the elementary bus of highest rank, B3 (of course, the number of elementary buses, and hence of attempts, may be different and in particular greater). In the event of a conflict on this elementary bus of highest rank, with a pixel having a higher priority level, no reset takes place: instead, the circuit CLA simply maintains its request until the bus is free. To determine the light intensity level IL at the pixel, the readout circuit (or a processor processing the data provided by the readout circuit) takes into account both the time of reception of the signal APX and the number of resets performed, this number being expressed by the rank of the elementary bus used. More specifically, the light intensity IL is proportional to the intensity of the photocurrent I, which is given by:

$$I = \frac{C(V_{RST} - V_{TH})}{T_R}N \quad (2)$$

where C is the capacitance value of the integration capacitor, $V_{RST}$ is its reset voltage, $T_R$ is the time of reception of the signal APX by the readout circuit, N is the number of the elementary bus used (N=1 for B1, N=2 for B2, N=3 for B3).

An error is introduced only if the circuit CLA has to wait for the last elementary bus (B3) to be free.

The pixel of rank 1 differs from that of FIG. 2a only in that it does not receive signals from pixels of lower rank, since these pixels do not exist. Similarly, the pixel of rank m does not transmit signals to pixels of higher rank.

Before describing the structure of the bus access logic circuit CLA in greater detail, it is appropriate to explain its operation with the aid of FIGS. 3, 4a-4d, 5a-5e, 6a-6d, 7a-7e.

The flowchart of FIG. 3 illustrates the operating principle of a pixel PX.

Step E0 corresponds to the overall reset of the matrix. As explained above, following this reset, the pixel PX (like all of the other pixels of the matrix) starts to integrate the charge photogenerated by its photodetector. The voltage V across the terminals of its integration capacitor varies (decreases, in general) linearly, until reaching the threshold value $V_{TH}$ at a time T. At this point, the comparator CMP generates the trigger signal FL (step E1). The logic circuit CLA then checks whether the maximum number of resets (two in the example of FIG. 2a) has been reached (E2). If so, it checks whether the elementary bus of maximum rank, B3, is free (E5), i.e. that it is not occupied by a pixel of higher priority level. If this is the case, it uses this elementary bus to transmit the signal APX (its address) to the readout circuit (E7), otherwise it waits (E6). If, conversely, the maximum number of resets has not been reached, the logic circuit checks whether the elementary bus corresponding to the number of resets already performed (B1 if no resets have taken place, B2 if there has been one) is free (E3). If the chosen elementary bus is free, it is used to transmit the signal APX to the readout circuit (E7), and the pixel is turned off. Otherwise, the pixel is reset and a new charge integration step begins.

FIGS. 4a-4d and 5a-5e illustrate this operation with an example.

A column consisting of 5 pixels PX1-PX5, a bus formed of three elementary buses B1, B2 and B3, and a readout circuit CL are considered. The pixels PX1, PX2, PX4 and PX5 are exposed to one and the same light intensity, and the pixel PX3 to an intensity that is lower by a factor of 2. FIGS. 5a, 5b, 5c, 5d and 5e are graphs of the voltage V across the terminals of the integrator of the pixels PX1, PX2, PX3, PX4 and PX5, respectively, over time.

At time $T_1$=T (FIG. 4a), the pixels PX1, PX2, PX4 and PX5 seek to access the bus, more specifically the elementary bus B1, at the same time. The pixel having the highest priority level, PX1, succeeds in transmitting its address over the bus, then turns off. Conversely, the pixels PX2, PX4 and PX5 must abandon transmission and reset. During this time, the integration capacitor of the pixel PX3 discharges more slowly since the photodetector associated therewith receives a lower light intensity.

At time $T_2=2*T$ (FIG. 4b), the pixels PX2, PX4 and PX5 again seek to access the bus, but this time the access attempt concerns the elementary bus B2, since these pixels have already been reset once during the current frame period. At the same time, the pixel PX3 seeks to access the elementary bus B1. The pixel PX1 is turned off, and no longer participates. As in the preceding case, only the pixel having the highest priority level among those attempting access succeeds in transmitting its address to the readout circuit: this is the pixel PX2 which, after having carried out its transmission, is turned off. The pixels PX3, PX4 and PX5 are reset and start integrating photogenerated charge again.

At time $T_3=3*T$ (FIG. 4c), the pixels PX4 and PX5 trigger for the third time, and simultaneously attempt to access the third elementary bus B3. As this is the last available elementary bus, no reset takes place: the pixel having the highest priority level—PX4—is the first to transmit its address, while PX5 does so just afterwards, at a time $3T+T_{err}$. After having transmitted their address, these pixels are turned off. It is understood that the estimate of the light intensity of the pixel PX5 is slightly off because of the additional delay $T_{err}$.

Lastly, at time $T_4=4*T$ (FIG. 4d), the pixel PX3 transmits its address APX over the elementary bus B2.

As mentioned above, it is possible and advantageous also to employ a mechanism for pooling spatial information. Most often, within an image, luminosity varies little between nearby pixels. It is therefore very common for several adjacent pixels to seek to access the bus at the same time. This results in numerous conflicts, which consume energy and may even degrade the quality of the reconstructed image by causing errors in the estimation of the light intensity, as explained above for pixel PX5. According to this optional mechanism, when two adjacent pixels seek to access one and the same elementary bus at the same time, the pixel having the lowest priority level is not reset, but waits. It therefore never sends its address to the readout circuit. However, this does not lead to a loss of information, since during reconstruction of the image those pixels that have not sent their address are assigned the same light intensity as their nearest neighbor of higher priority level.

FIGS. 6a-6d and 7a-7e illustrate this operation with an example. As in the case of FIGS. 4a-4d and 5a-5e, a column consisting of 5 pixels PX1-PX5, a bus formed of three elementary buses B1, B2 and B3, and a readout circuit CL are considered. The pixels PX1, PX2, PX4 and PX5 are exposed to one and the same light intensity, and the pixel PX3 to an intensity that is lower by a factor of 2. FIGS. 7a, 7b, 7c, 7d and 7e are graphs of the voltage V across the terminals of the integrator of the pixels PX1, PX2, PX3, PX4 and PX5, respectively, over time.

At time $T_1=T$ (FIGS. 6a and 6b), the pixels PX1, PX2, PX4 and PX5 seek to access the bus, more specifically the elementary bus B1, at the same time. The pixel having the highest priority level, PX1, succeeds in transmitting its address over the bus, and turns off. The mechanism for pooling spatial information also results in PX2 and PX5 being turned off, due to conflicts with PX1 and PX4, respectively. The pixel PX4 is reset.

At time $T_{2=2}*T$, the pixel PX3 accesses the elementary bus B1 and PX4 seeks to access the elementary bus B2. The conflict is resolved in favor of PX3, whose priority level is higher, while PX4 is reset. Although the access conflict takes place between closest neighbors, the mechanism for pooling spatial information does not intervene (and hence PX4 is not turned off) because the elementary buses in question are different.

Lastly, at time $T_{3=3}*T$, the pixel PX4 transmits its address APX over the elementary bus B3.

FIGS. 7a, 7b, 7c, 7d and 7e are graphs of the voltage V across the terminals of the integrator of the pixels PX1, PX2, PX3, PX4 and PX5, respectively, over time.

It should be noted that the number of bus access attempts has been decreased from 11 to 7 and that the majority of pixels have been turned off earlier than in the preceding case (FIGS. 4a-5e). The gain in terms of energy consumption is quite considerable. Furthermore, there was no delay in transmitting any pixel address, and hence there was no error in intensity estimate.

The longer the time taken by a pixel to transmit its address over the bus, the greater the number of conflicts, and therefore the greater the number of pixels that will be turned off by the mechanism for pooling spatial information, decreasing consumption. However, if this time is relatively long, pixels illuminated by similar but distinct intensity levels will be liable to come into conflict, and hence to be assigned an identical intensity level, which manifests as noise.

Returning to the functional diagram of FIG. 2a, it should be noted that the bus access logic circuit CLA comprises three functional blocks: a module for pooling spatial information MMIS, an elementary bus selection module MCB and a bus access module MAB.

Figure 2B:
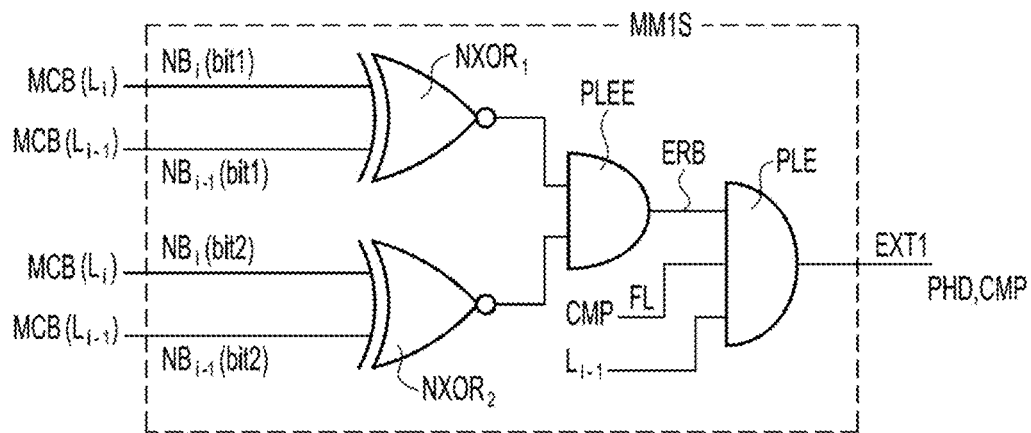

As illustrated by FIG. 2b, the module for pooling spatial information MMIS comprises an input for the trigger signal of the nearest neighbor of lower rank, $L_{i-1}$, and an input for the trigger signal of the pixel, FL. In the event of the two signals being received at the same time, the module generates the signal EXT1 which turns off the photodetector PHD and the comparator CMP. Furthermore, the signal FL is transmitted to the equivalent module of the pixel of higher rank, $L_{i+1}$, and to the bus selection module, MCB. As illustrated in FIG. 2b, this module may be based on an "AND" logic gate with three inputs, PLE. The signals on the three inputs of the gate PLE are the trigger signal FL of the pixel, the trigger signal of the pixel of higher rank $FL(L_{i+1})$ and a signal ERB that is representative of a bit-to-bit equality between the signal NB generated by the module MCB, representative of the chosen bus number (see below), and the signal NB of the pixel of lower rank, $L_{i-1}$. To generate the signal ERB, the bits $NB_i(bit1)$, $NB_{i-1}(bit1)$, $NB_i(bit2)$, $NB_{i-1}(bit2)$ of the bus numbers are compared pairwise using EXCLUSIVE NOR gates NXOR1, NXOR2, the outputs of which are delivered to an "AND" gate PLEE. FIG. 2b relates to the case in which the bus numbers are represented by two bits (which allows at most four buses to be used), but a generalization does not present any difficulty.

Figure 2C:
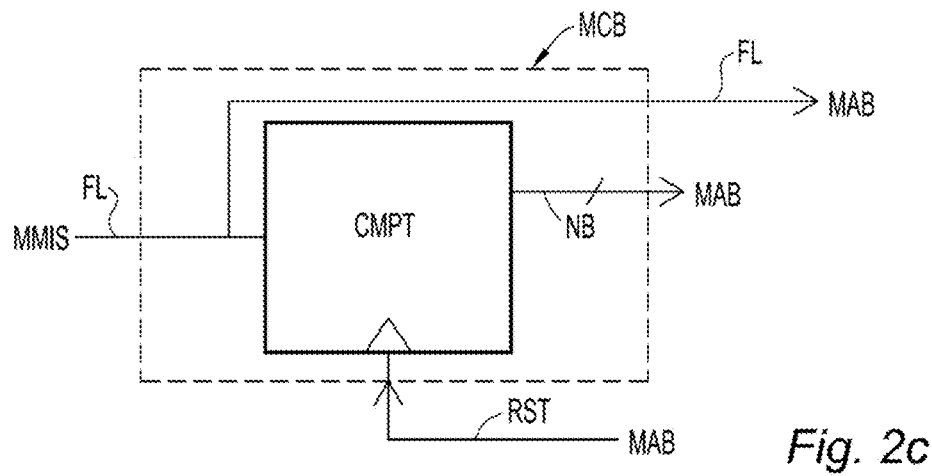

The bus selection module MCB (FIG. 2c) consists simply of a counter CMPT which is incremented each time it receives the trigger signal FL arising from the comparator CMP via the module MMIS. Its output signal NB, transmitted to the access module MAB, corresponds to the value of the count and denotes the chosen elementary bus. It is a signal of multiple bits—2 in the embodiment considered here, in which the three elementary buses B1, B2 and B3 may be denoted by 00, 01 and 10. The trigger signal FL is also transmitted to the access module MAB. The counter CMPT is incremented by the pixel reset signal, RST, generated by the module MAB.

Figure 2D:
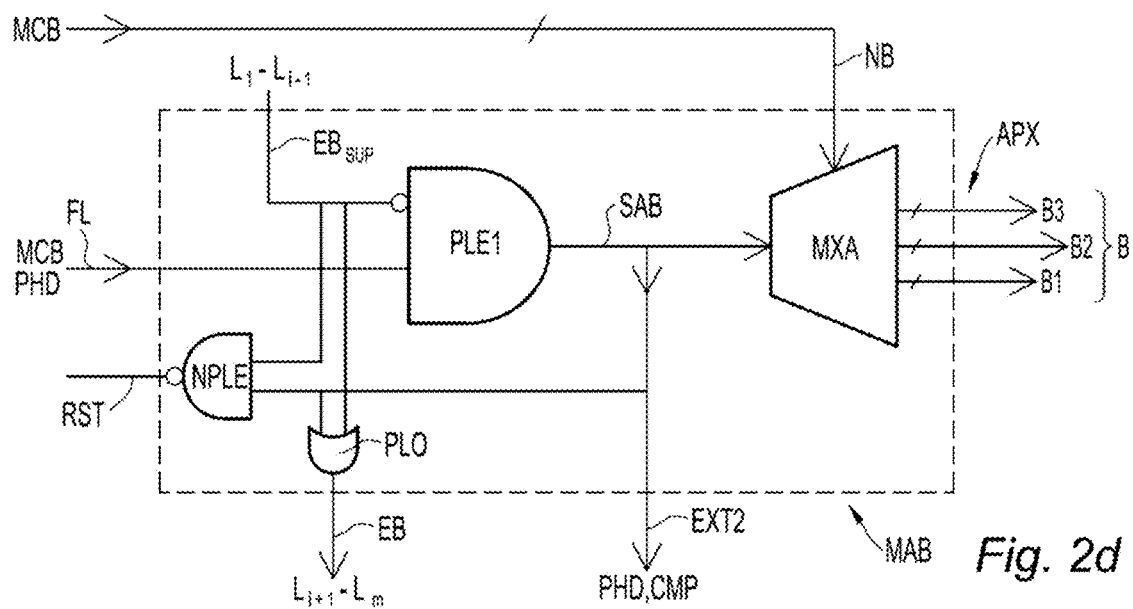

The bus access module MAB (FIG. 2d) is slightly more complex. It has three inputs for: the trigger signal FL arising from the comparator CMP via the modules MMIS and MCB; a binary signal $EB_{SUP}$ arising from the block of pixels of the column belonging to rows of lower rank $L_1$-$L_{i-1}$; and the signal NB generated by the bus selection module MCB; and four outputs for: a signal EXT2 for turning off the photodetector PHD and the comparator CMP; a signal RST for resetting the photodetector PHD and the integration capacitor INT, a signal EB that is representative of the state of the bus, which is transmitted to the block of pixels of the column belonging to rows of higher rank $L_{i+1}$-$L_m$ (and constitutes, for the latter, the signal $EB_{SUP}$); and the signal APX that is indicative of the address of the pixel.

The signal $EB_{SUP}$ and the trigger signal FL are applied to the inputs of an "AND" logic gate PLE1. The signal SAB output by this logic gate takes a "1" logic value if and only if FL=1 (i.e. if the trigger signal is present and the pixel must therefore attempt to access the bus) and $EB_{SUP}$=0 (i.e. no pixel having a higher priority level has pre-empted the bus); this signal confirms that the bus may indeed be accessed. The signal SAB is delivered to an input, referred to as the activation input, of the address multiplexer MXA, which also receives, over another input referred to as the selection input, the signal NB. The address multiplexer NB has a plurality of outputs with M bits, which are linked to respective elementary buses (B1, B2, B3). The number M of bits must be sufficient to identify all of the pixels of a column; typically M=$\lceil \log_2(m) \rceil$, where m is the number of rows of the matrix and $\lceil\ \rceil$ denotes the ceiling function. When it receives the signal SAB over its activation input, the access multiplexer delivers, over the output determined by the signal NB present on its selection input, the M-bit signal APX, which unequivocally identifies the pixel within the column.

An element introducing a delay may be added to the input of the signal FL in the module MAB to ensure effective timing of the circuit.

The signal SAB is also delivered:
To an input of a "NAND" logic gate PLE2, which receives, over its other input, the trigger signal FL. The output signal of this logic gate is the signal RST which orders the photodetector PHD to reset and the counter CMPT to increment.
To an input of an "OR" logic gate PLO, the output of which is the signal RST (bus occupation) which constitutes the signal $RST_{SUP}$ for the pixel of higher rank.
Furthermore, the signal SAB is taken from an output of the module MAB to form the signal EXT2 which, just like EXT1, orders the photodetector PHD and the comparator CMP to turn off.

The readout circuit receives the address signals APX, applies a timestamp thereto and transmits everything together (address; bus over which the address has been received; timestamp) to a processor which proceeds to reconstruct the image. As a variant, the readout circuit may directly calculate the light intensity associated with each pixel (equation 2) and transmit the calculated value to the processor. The production of such a circuit does not present any particular difficulty to a person skilled in the art, who is an expert in the field of digital electronics.

The invention has been described with reference to one particular embodiment, but numerous variants may be envisaged. For example:
As shown in FIG. 8a, the readout circuit CL may comprise multiple independent readout modules, ML1, ML2, ML3, one for each elementary bus. The advantage of this approach is that address signals APX transmitted by different pixels over different elementary buses may be read independently of one another, without this resulting in a conflict. However the complexity of the readout circuit and its energy consumption are increased.

Preferably, each elementary bus comprises M individual conductors so as to allow the parallel transmission of the M bits of the address signal APX. It is possible to envisage transmitting the address in series over a single conductor, but this would require a much more complex bus access module and result in a longer transmission time, and hence an increased probability of conflict.

Instead of using a bus consisting of a plurality of elementary buses, it is possible to use a single bus and to transmit both the address signal APX and a digital signal indicating the number of resets to the readout circuit. This is illustrated in FIG. 8b in which the readout circuit is denoted by the reference CL'. However, the use of multiple elementary buses in parallel is preferred, in particular in the case of production using advanced CMOS technology, which allows high interconnection density.

In the described embodiment, a trigger signal is generated when the pixel voltage V crosses a threshold. In a manner known per se, other types of events at the level of the pixel may be used to generate a trigger signal.

The number of elementary buses, or more generally the number of possible resets in each frame, is one of the most important design parameters for an image sensor according to the invention. The greater this number, the lower the probability that the acquisition time of an address signal will be rendered incorrect by repeated conflicts (the case of the pixel PX5 in FIGS. 4a-5e). However, the number of possible resets is restricted by the frame acquisition rate; additionally, multiplying the elementary buses increases the complexity of the circuit. In practice however, it is found that the number of elementary buses may be limited to a few units while providing a satisfactory image quality. This is illustrated with the aid of FIGS. 9a-9d.

Figure 9A:
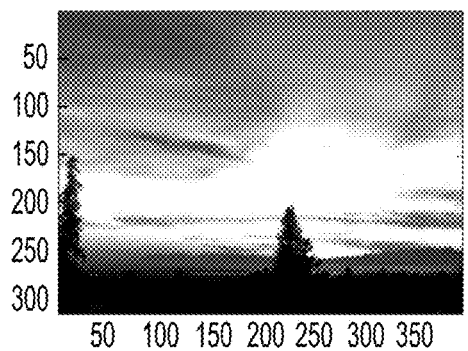
FIGS. 9a-9d allow the quality of the images acquired by sensors according to different embodiments of the invention to be assessed.

FIG. 9a is a reference image, acquired by means of an active pixel CMOS sensor.

Figure 9B:
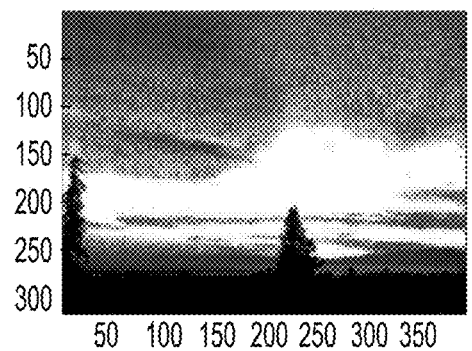
Figure 9C:
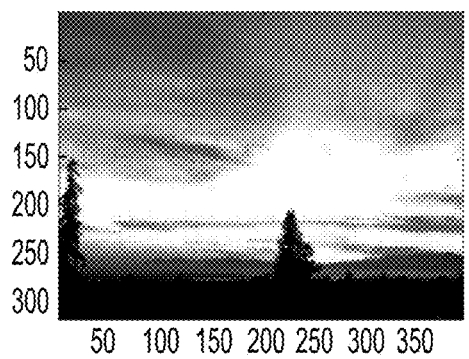
Figure 9D:
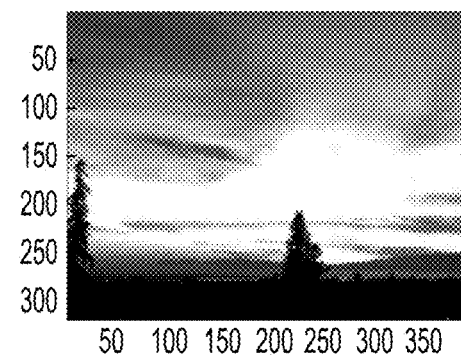

FIG. 9b has been obtained using a simulation of a sensor according to the invention comprising two elementary buses, and hence a single possible reset for each pixel. Obviously, the quality of this image is unsatisfactory. It may be quantified by its PSNR (peak signal-to-noise ratio), defined by:

$$PSNR = 10 \cdot \log_{10}\left(\frac{d^2}{EQM}\right)$$

where d is the dynamic range of the signal (for a signal coded over nb bits, d=$2^{nb}$) and EQM is the mean squared error of the pixels in the image under consideration with respect to the corresponding pixels of the reference image (FIG. 9a). In the case of FIG. 9b, PSNR=28.4943 dB.

By increasing to 3 elementary buses (FIG. 9c), the PSNR increases by more than 10 decibels, to PSNR=29.9434.

Increasing to 4 elementary buses (FIG. 9d) raises the PSNR still further, up to a value of 36.5402, which is most satisfactory.

It is possible to implement a "gradual wakeup" strategy, in which the number of elementary buses used is dynamically adjusted (within the limits of a maximum dictated by the number of available conductors) according to the measured quality of the image and a required quality level.

In the embodiment described above, the priority level of a pixel is entirely predetermined and more specifically depends solely on its rank within the column; this may be referred to as an "intrinsic" priority. According to another embodiment of the invention, the priority depends mainly on the elementary bus over which the pixel intends to transmit its address (and hence on the number of transmission attempts already made). This may be referred to as an "extrinsic" priority. Concretely, with reference to the architecture of FIG. 2a, those pixels which intend to transmit over the elementary bus B3 have priority with respect to those which intend to transmit over the elementary buses B2 and B1, and those which intend to transmit over B2 have priority with respect to those which intend to transmit over B1. Conflicts among pixels having the same extrinsic priority (i.e. which intend to transmit over the same bus) are resolved by taking intrinsic priority (i.e. their rank) into account. This embodiment requires a more complex access logic circuit, the production of which however does not present any particular difficulty for a person skilled in the art.

The invention has been described with reference to the case of an image sensor comprising a matrix of pixels, each comprising a photodetector. The invention applies more generally to any type of matrix-array sensor comprising an arrangement of detection elements, each comprising an elementary sensor configured to generate an electric current having an intensity that is representative of (for example, proportional to) a physical quantity to be detected. This may be, for example, a heat sensor, a chemical sensor, a pressure sensor, etc.

The invention claimed is:

1. A matrix-array sensor comprising a matrix of detection elements that are arranged in rows and in columns and a readout circuit for each column, the detection elements of one and the same column being linked to the corresponding readout circuit via a bus, each detection element comprising a sensor for generating an electric current having an intensity that is representative of a physical quantity to be detected, a charge integrator configured to accumulate charge generated by said sensor, a comparator configured to generate a trigger signal when a voltage level across the terminals of this comparator reaches a threshold level, and a bus access logic circuit configured to receive, as input, said trigger signal and, following reception of said signal, to attempt to transmit, over said bus, an address of said detection element in the column, wherein the detection elements of one and the same column have different bus access priority levels, and wherein said bus access logic circuit of each detection element is configured:
  to abandon transmission of said address and reset the charge integrator of the detection element if the bus is pre-empted by a detection element having a higher priority level;
  to count a number of attempts made before being able to transmit said address; and
  to communicate said number to said readout circuit along with said address of the detection element.

2. The matrix-array sensor as claimed in claim 1, wherein said bus comprises a plurality of elementary buses, the bus access logic circuit of each detection element being configured to transmit said address over an elementary bus chosen according to the number of attempts it has made before being able to transmit the address of the detection element.

3. The matrix-array sensor as claimed in claim 2, wherein each bus access logic circuit is configured to abandon transmission of the address of the detection element the moment an elementary bus of said bus is pre-empted by a detection element having a higher priority level.

4. The matrix-array sensor as claimed in claim 2, wherein each said readout circuit comprises a plurality of readout modules that are associated with respective elementary buses and wherein each bus access logic circuit is configured to abandon transmission of the address of the detection element when the elementary bus over which it is attempting to carry out the transmission is pre-empted by a detection element having a higher priority level, and to carry out the transmission otherwise.

5. The matrix-array sensor as claimed in claim 1, wherein each bus access logic circuit is configured to wait for the bus to be available after having made a predetermined maximum number of transmission attempts.

6. The matrix-array sensor as claimed in claim 1, wherein said readout circuit is configured to determine a light intensity level received by a detection element having transmitted its address from the instant in time at which said address was transmitted and the number of transmission attempts made.

7. The matrix-array sensor as claimed in claim 1, wherein each bus access logic circuit is configured to order the sensor and the comparator of the detection element to turn off after having transmitted its address, and to order them to turn back on again after a frame period.

8. The matrix-array sensor as claimed in claim 1, wherein each bus access logic circuit is configured to order the sensor and the comparator of the detection element to turn off after having made an attempt to transmit the address of said detection element at the same time, and after one and the same number of attempts, as the detection element having the priority level immediately above it.

9. The matrix-array sensor as claimed in claim 1, wherein the priority levels of the detection elements of a column are predetermined.

10. The matrix-array sensor as claimed in claim 9, wherein the priority levels of the detection elements of a column correspond to their rank in said column.

11. The matrix-array sensor as claimed in claim 1, wherein the priority levels of the detection elements of a column depend both on their rank in said column and on the number of bus access attempts already made.

12. An image sensor formed by a matrix-array sensor as claimed in claim 1, wherein said detection elements are pixels comprising, as a sensor, a photodetector.

* * * * *